United States Patent
Lin

(10) Patent No.: US 10,215,179 B2
(45) Date of Patent: Feb. 26, 2019

(54) ASH-COLLECTING AND EXHAUST DEVICE FOR GRAIN DRYER

(71) Applicant: SUNCUE COMPANY LTD., Taichung (TW)

(72) Inventor: Jung-Lang Lin, Taichung (TW)

(73) Assignee: Suncue Company Ltd., Taichung (TW)

( * ) Notice: Subject to any disclaimer, the term of this patent is extended or adjusted under 35 U.S.C. 154(b) by 511 days.

(21) Appl. No.: 15/049,188

(22) Filed: Feb. 22, 2016

(65) Prior Publication Data
US 2017/0239603 A1    Aug. 24, 2017

(51) Int. Cl.
| | |
|---|---|
| *B01D 45/12* | (2006.01) |
| *F04D 17/06* | (2006.01) |
| *F04D 29/70* | (2006.01) |
| *F26B 25/00* | (2006.01) |

(52) U.S. Cl.
CPC ........... *F04D 17/06* (2013.01); *F04D 29/701* (2013.01); *F26B 25/005* (2013.01); *B01D 45/12* (2013.01)

(58) Field of Classification Search
CPC ...... F04D 17/06; F04D 29/701; F25B 25/005; B01D 45/12
See application file for complete search history.

(56) References Cited

FOREIGN PATENT DOCUMENTS

| | | | |
|---|---|---|---|
| JP | 2004257576 A | * | 9/2004 |
| JP | 2014074584 A | * | 4/2014 |

OTHER PUBLICATIONS

JP 2004257576 Machine Translation. Accessed EPO website Sep. 5, 2018. 8 Pages.*

* cited by examiner

*Primary Examiner* — Richard A Edgar
(74) *Attorney, Agent, or Firm* — Rosenberg, Klein & Lee

(57) ABSTRACT

An ash-collecting and exhaust device for a grain dryer has a body, a fan unit, and a driving unit. The body is a hollow barrel, and has an air inlet, an air outlet, and an internal surface being divergent adjacent to the air inlet. The fan unit is rotatably mounted in the body to enable external air to flow into the body via the air inlet and flow out of the body via the air outlet, and has an external surface being obliquely divergent to form an oblique passage between the body and the fan unit. The driving unit is securely mounted on the body, is connected to the fan unit to enable the fan unit to rotate relative to the body to guide the external air flowing into the body.

19 Claims, 9 Drawing Sheets

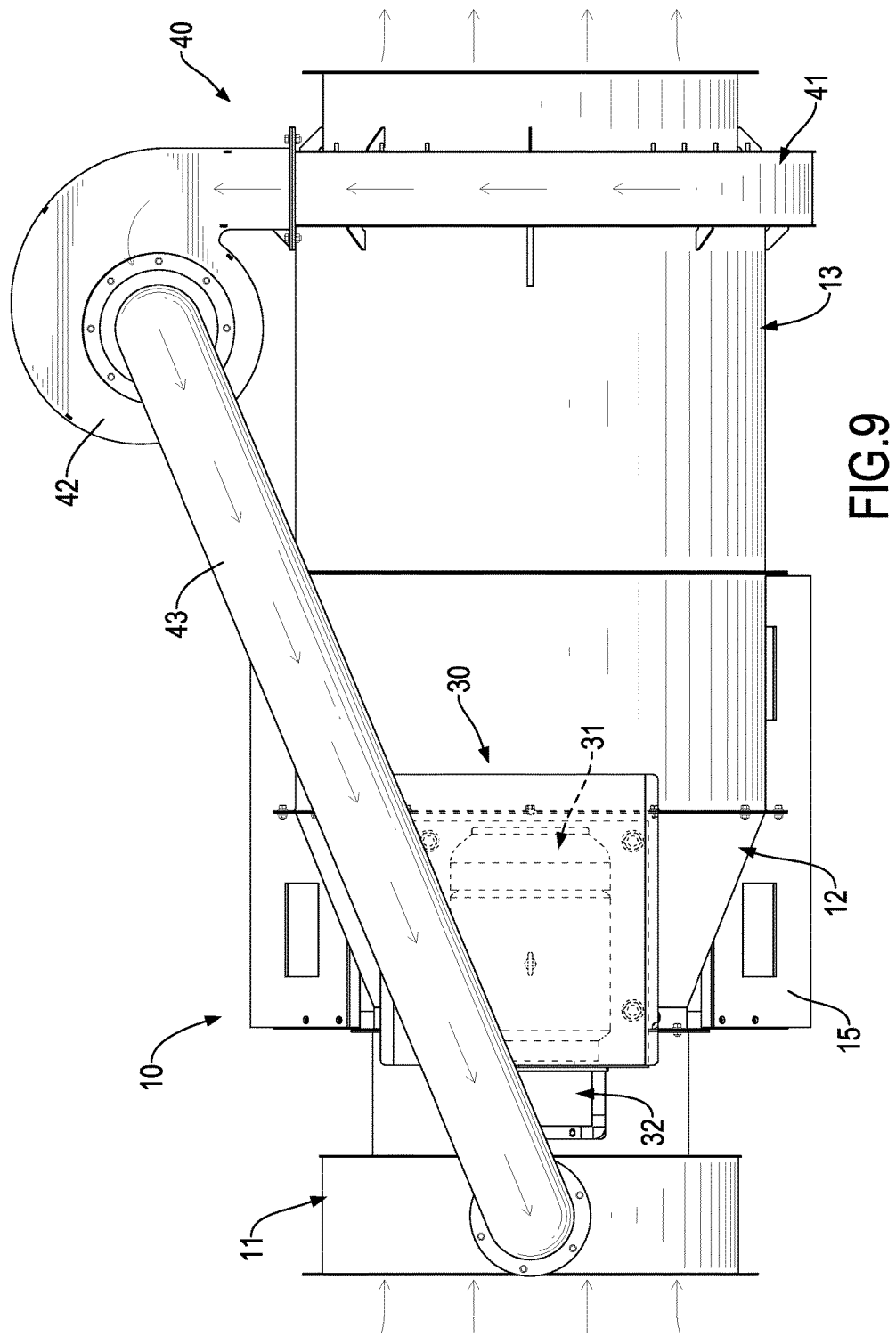

ASH-COLLECTING AND EXHAUST DEVICE FOR GRAIN DRYER

BACKGROUND OF THE INVENTION

1. Field of the Invention

The present invention relates to an ash-collecting and exhaust device, and more particularly to an ash-collecting and exhaust device for a grain dryer that may prevent ashes or impurities from accumulating in and damaging a fan unit of the ash-collecting and exhaust device, may prevent a driving motor from producing high temperature due to the ashes or impurities during operation, and may prolong the life of the ash-collecting and exhaust device, reduce the cost of use, and may collect the ashes or impurities repeatedly to provide an air-cleaning effect to the ash-collecting and exhaust device.

2. Description of Related Art

Grains such as rice, wheat or coffee beans need to be processed by a shelling process, and the husks that are shelled from the grains can be used as biomass fuels for a conventional grain dryer. A heat source that is generated by burning the biomass fuels in a conventional grain dryer may be used to dry or adjust the moisture content of the grains, and this may achieve an effect of resource recovery and reuse. The conventional grain dryer has an ash-collecting fan device to collect ashes or impurities in the air that exhausts from the conventional grain dryer to reduce pollution and provide clean air for use.

The ash-collecting fan device of the conventional grain dryer has a body, a driving motor, and a fan. The body is a hollow casing and has two ends, an air inlet, and an air outlet. The air inlet and the air outlet are respectively formed in the two ends of the body. The driving motor is mounted in the body between the air inlet and the air outlet. The fan is mounted in the body, is connected to the driving motor between the air inlet and the driving motor, and is rotated relative to the body by the driving motor. When the fan is rotated by the driving motor relative to the body, air that contains ashes or impurities may flow into the body via the air inlet. When the air flows into the body, the body has at least one guiding plate formed in an internal surface of the body to enable the air to flow as a centrifugal wind, and this may enable the ashes or impurities in the air to accumulate on the internal surface of the body. Then, the ashes or impurities in the air may be reduced when the air flows out of the ash-collecting fan device.

Although the ash-collecting fan device may provide an ash-collecting and air-cleaning effect to the conventional grain dryer, the ashes or impurities are accumulated on the internal surface of the body by the centrifugal wind that is formed by the fan and the at least one guiding plate of the body. In order to prevent the fan from breaking or damage during rotation since the structural strength of the fan is insufficient, the ash-collecting fan device has an annular strengthening rib connected to blades of the fan to improve the structural strength of the fan. However, the ashes or impurities in the air may be accumulated on positions between the blades and the strengthening rib, and the fan may be vibrated and damaged during the rotation process by the accumulated ashes or impurities after a long time of use.

In addition, the driving motor that is mounted in the body may be affected by the ashes or impurities that are accumulated on the driving motor, and the temperature of the driving motor may be increased, thereby shortening the life of the driving motor. Furthermore, for maintenance or repair of the driving motor that is mounted in the body, the driving motor has to be removed from the body and this may increase the time and cost of use.

To overcome the shortcomings, the present invention provides an ash-collecting and exhaust device for a grain dryer to mitigate or obviate the aforementioned problems.

SUMMARY OF THE INVENTION

The main objective of the present invention is to provide an ash-collecting and exhaust device for a grain dryer that may prevent ashes or impurities from accumulating in and damaging a fan unit of the ash-collecting and exhaust device, may prevent a driving motor from producing high temperature due to the ashes or impurities during operation, and may prolong the life of the ash-collecting and exhaust device, reduce the cost of use, and may collect the ash or impurities repeatedly to provide an air-cleaning effect to the ash-collecting and exhaust device.

The ash-collecting and exhaust device for a grain dryer in accordance with the present invention has a body, a fan unit, and a driving unit. The body is a hollow barrel, and has an air inlet, an air outlet, and an internal surface being divergent adjacent to the air inlet. The fan unit is rotatably mounted in the body to enable external air to flow into the body via the air inlet and flow out of the body via the air outlet, and has an external surface being obliquely divergent to form an oblique passage between the body and the fan unit. The driving unit is securely mounted on the body, and is connected to the fan unit to enable the fan unit to rotate relative to the body to guide the external air flowing into the body.

Other objectives, advantages and novel features of the invention will become more apparent from the following detailed description when taken in conjunction with the accompanying drawings.

BRIEF DESCRIPTION OF THE DRAWINGS

FIG. 9 is an operational top view of the ash-collecting and exhaust device in FIG. 3.

DETAILED DESCRIPTION OF THE PREFERRED EMBODIMENT

Figure 1:
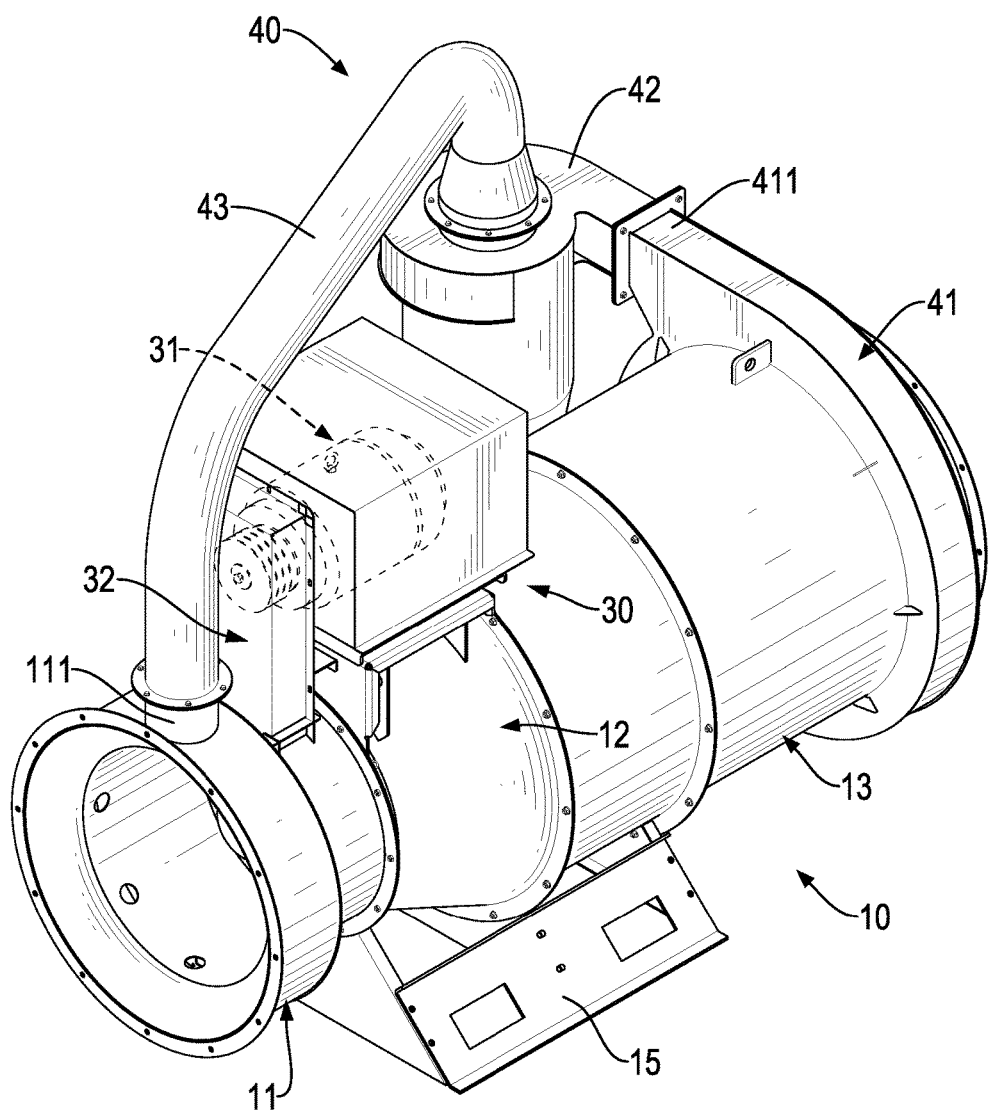
FIG. 1 is a perspective view of an ash-collecting and exhaust device for a grain dryer in accordance with the present invention.
Figure 2:
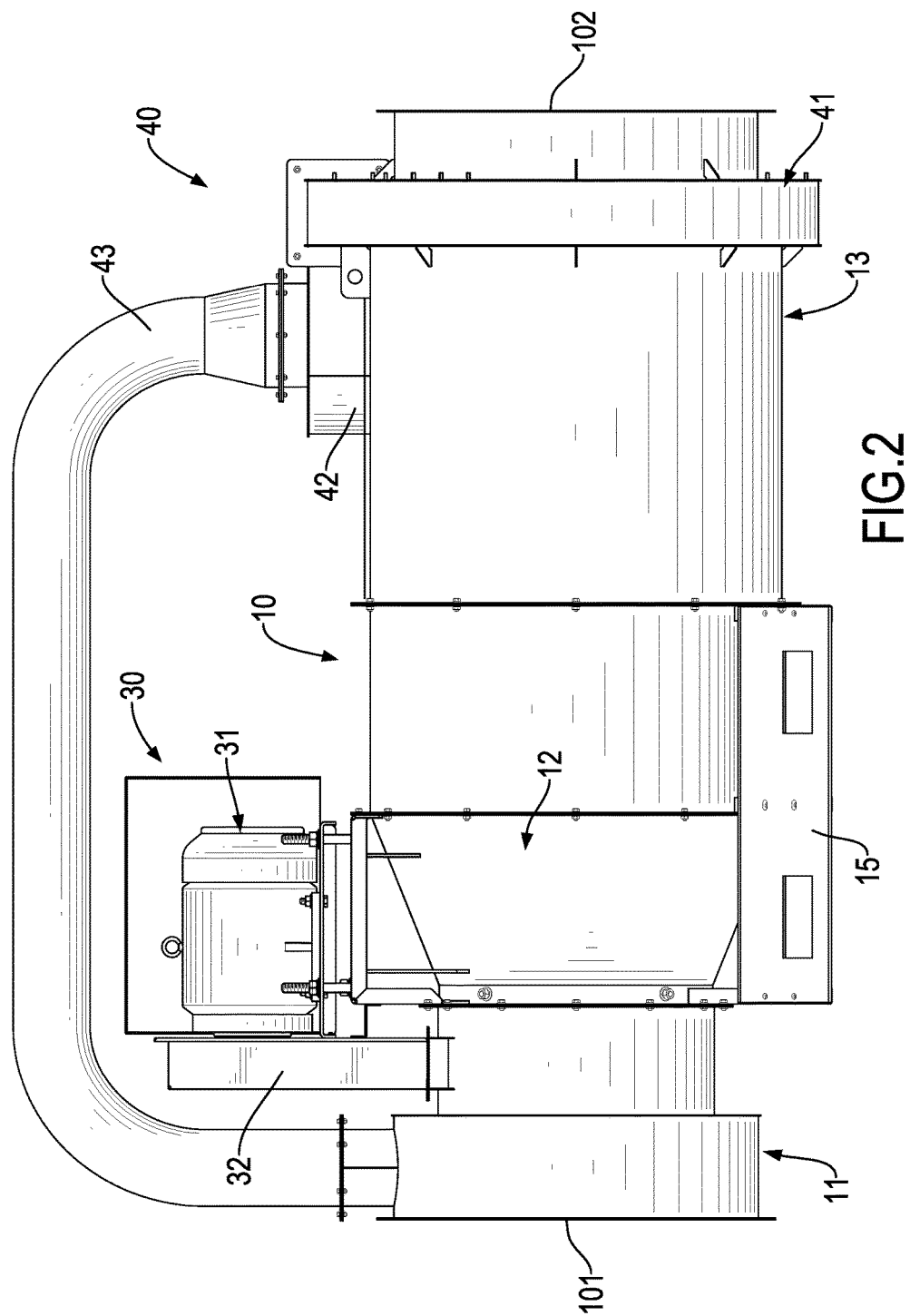
FIG. 2 is a side view in partial section of the ash-collecting and exhaust device in FIG. 1.
Figure 3:
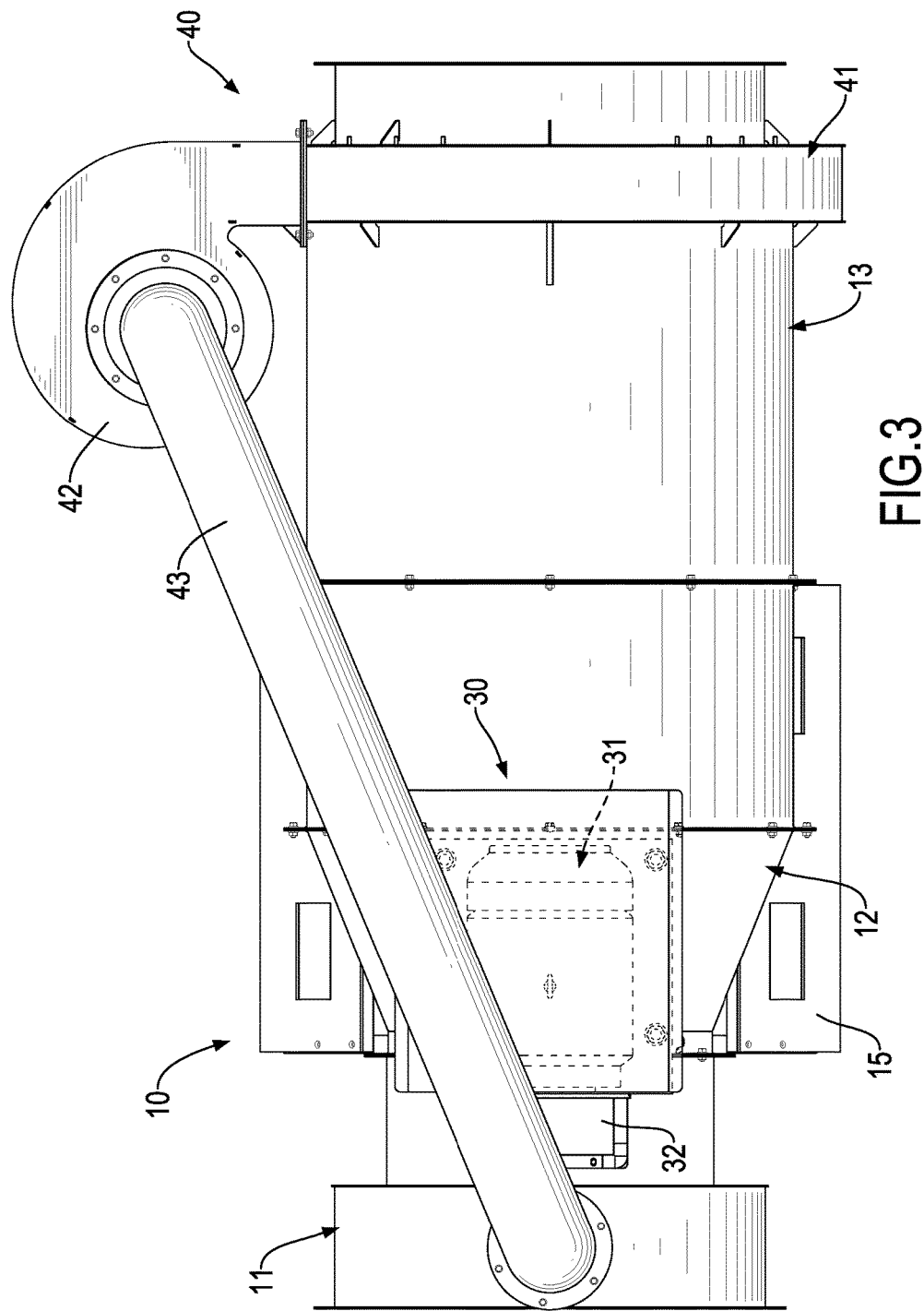
FIG. 3 is a top view of the ash-collecting and exhaust device in FIG. 1.

With reference to FIGS. 1 to 3, an ash-collecting and exhaust device for a grain dryer in accordance with the present invention has a body 10, a fan unit 20, a driving unit 30, and a recovery unit 40.

Figure 4:
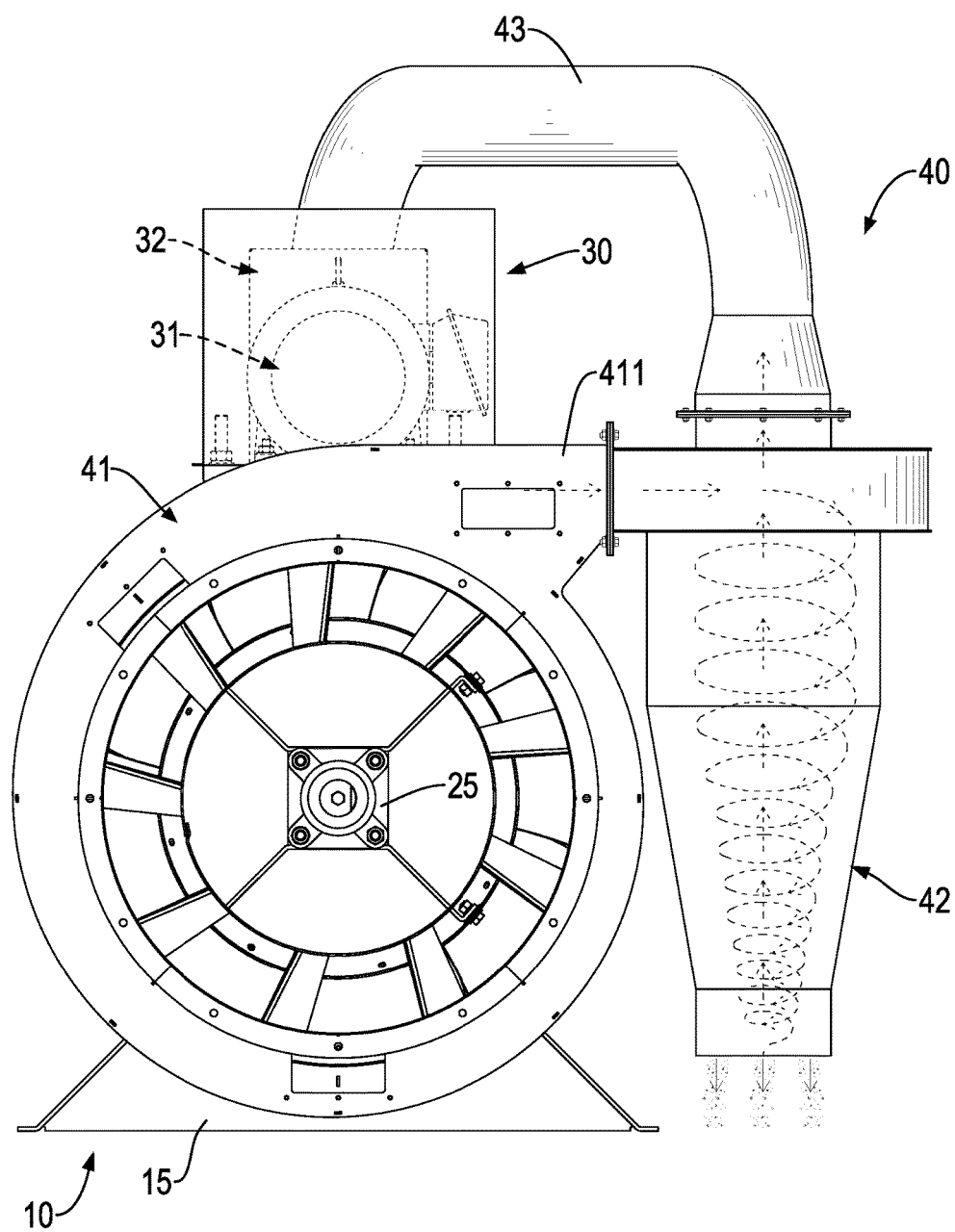
FIG. 4 is a rear side view of the ash-collecting and exhaust device in FIG. 1.
Figure 5:
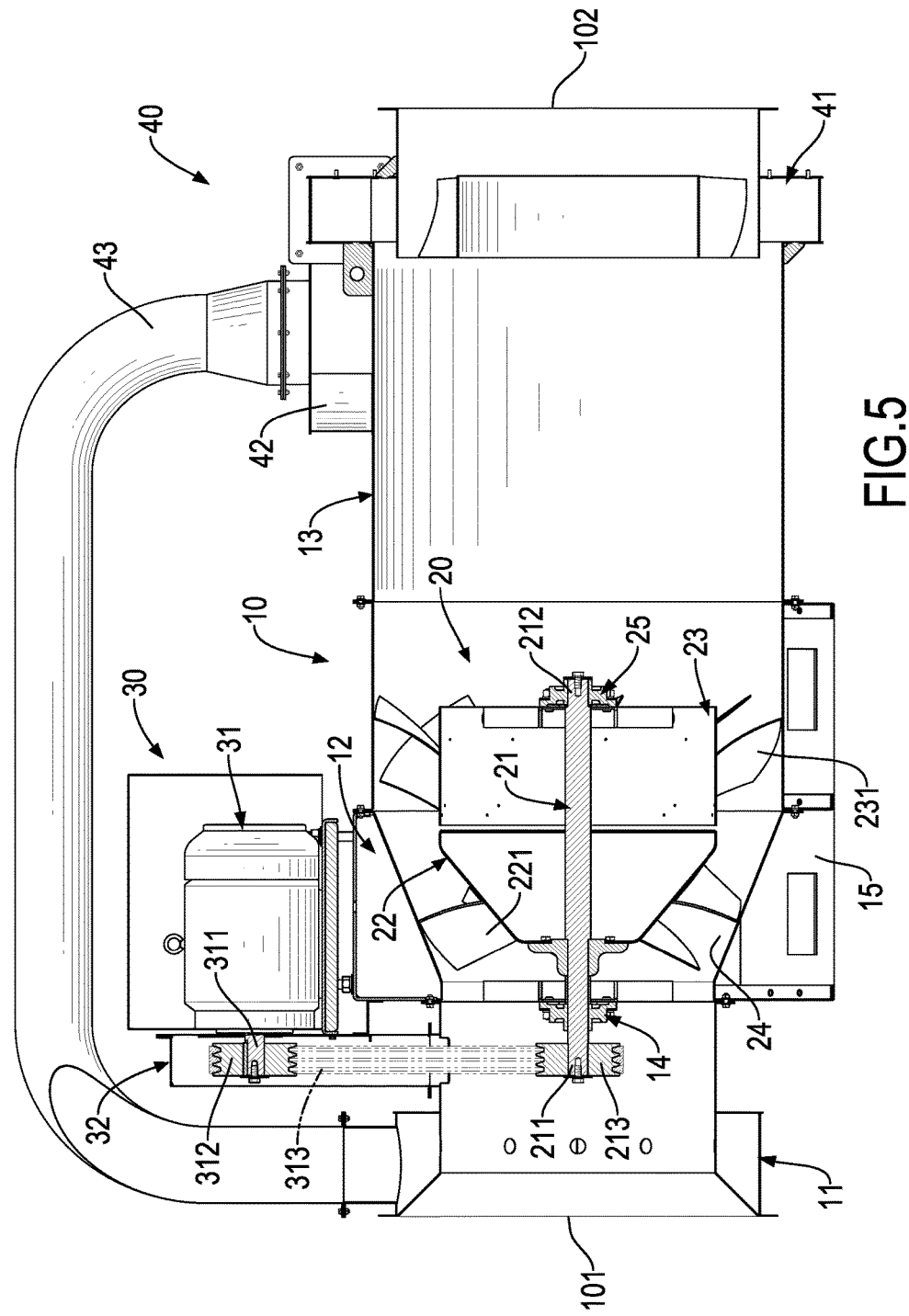
FIG. 5 is a side view in partial section of the ash-collecting and exhaust device in FIG. 2.
Figure 6:
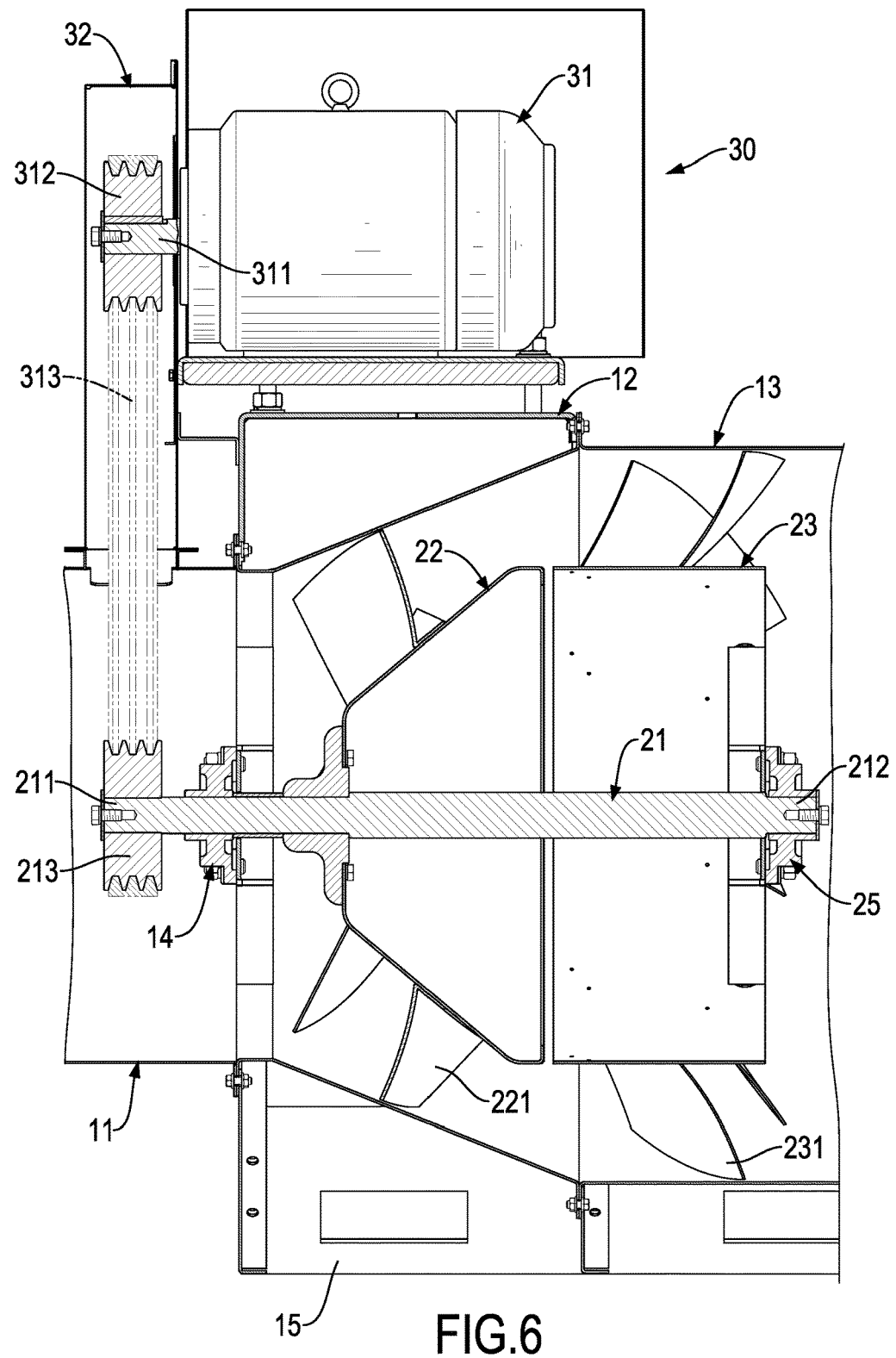
FIG. 6 is an enlarged side view in partial section of the ash-collecting and exhaust device in FIG. 5.

With reference to FIGS. 4 and 5, the body 10 is a hollow barrel, and has two ends, an air inlet 101, an air outlet 102, an inlet shield 11, a guiding sheath 12, an exhaust housing 13, a holding mount 14, and a supporting base 15. The air inlet 101 and the air outlet 102 are respectively formed on the two ends of the body 10. The inlet shield 11, the guiding sheath 12, and the exhaust housing 13 are sequentially formed on the body 10 from the air inlet 101 to the air outlet 102 of the body 10. The inlet shield 11 is formed on the body 10 at the air inlet 101 of the body 10 and has a front side, a rear side, an external surface, and a connecting tube 111. The connecting tube 111 is radially formed on and protrudes from the external surface of the inlet shield 11 near the front side of the inlet shield 11.

The guiding sheath 12 is securely connected to the inlet shield 11 and has a front side, a rear side, and an internal surface. The front side of the guiding sheath 12 is connected to the rear side of the inlet shield 11. The internal surface of the guiding sheath 12 is divergent from the front side to the rear side of the guiding sheath 12. The exhaust housing 13 is securely connected to the guiding sheath 12 between the guiding sheath 12 and the air outlet 102 of the body 10 and has an external surface. Additionally, the inlet shield 11, the guiding sheath 12, and the exhaust housing 13 are connected to each other by screwing or welding. The holding mount 14 is formed in the body 10 at a connecting position between the inlet shield 11 and the guiding sheath 12. The supporting base 15 is mounted on a bottom of the body 10 above the guiding sheath 12 to enable the body 10 to dispose transversely.

The fan unit 20 is rotatably mounted in the body 10 near the air inlet 101 to enable external air to flow into the body 10 via the air inlet 101 and flow out of the body 10 via the air outlet 102, and has a rotating shaft 21, a fan 22, a rectifier seat 23, an oblique passage 24, and a fixing frame 25.

The rotating shaft 21 is rotatably mounted in the body 10, is connected to the holding mount 14 between the inlet shield 11, the guiding sheath 12, and the exhaust hosing 13, and has a transmitting end 211, a fixing end 212, and a transmitting wheel 213. The transmitting end 211 of the rotating shaft 21 extends into the inlet shield 11 via the holding mount 14. The fixing end 212 of the rotating shaft 21 extends into the exhaust housing 13 via the guiding sheath 12. The transmitting wheel 213 is securely mounted around the transmitting end 211 of the rotating shaft 21 in the inlet shield 11, and may be a pulley wheel.

The fan 22 may be a diagonal-flow fan, is mounted around the rotating shaft 21 in the guiding sheath 12, and has an external surface and multiple blades 221. The external surface of the fan 22 is obliquely divergent from the inlet shield 11 to the exhaust housing 13. The multiple blades 221 are formed on and protrude from the external surface of the fan 22 at spaced intervals.

The rectifier seat 23 is mounted around the rotating shaft 21 between the fan 22 and the fixing end 212 of the rotating shaft 21 in the exhaust housing 13, and has an external surface and multiple guiding vanes 231. The external surface of the rectifier seat 23 is annular and the multiple guiding vanes 231 are formed on and protrude from the external surface of the rectifier seat 23 at spaced intervals. The oblique passage 24 is formed in the guiding sheath 12 between the internal surface of the guiding sheath 12 and the external surface of the fan 22. The fixing frame 25 is mounted around the fixing end 212 of the rotating shaft 21, and is securely connected to the rectifier seat 23 to hold the rectifier seat 23 on the rotating shaft 21 to prevent the rectifier seat 23 from rotating relative to the rotating shaft 21 and the exhaust housing 13.

The driving unit 30 is securely mounted on the body 10, is connected to the fan unit 20 to enable the fan 22 of the fan unit 20 to rotate relative to the body 10 to guide external air flowing into the body 10, and has a driving motor 31 and a protecting cover 32.

The driving motor 31 is securely mounted on a top of the guiding sheath 12 and has a driving shaft 311, a driving wheel 312, and a transmitting belt 313. The driving shaft 131 extends out of the driving motor 31 toward the inlet shield 11. The driving wheel 312 is securely mounted around the driving shaft 311 above the transmitting wheel 213. The transmitting belt 313 is mounted around the driving wheel 312 and the transmitting wheel 213 via the inlet shield 11. Then, the driving motor 31 may drive the fan 22 to rotate relative to the guiding sheath 12 via the driving shaft 311, the driving wheel 312, the transmitting belt 313, the transmitting wheel 213, and the rotating shaft 21. The protecting cover 32 is securely connected to the driving motor 31 and the inlet shield 11 to mount around the driving wheel 312 and the transmitting belt 313.

The recovery unit 40 is connected to the body 10 and has a recovery cover 41, a cyclone 42, and a recovery pipe 43. The recovery cover 41 is mounted around the external surface of the exhaust housing 13, communicates with the exhaust housing 13, and has a top segment and a connecting mouth 411. The connecting mouth 411 is formed on the top segment of the recovery cover 41 and extends radially out of the exhaust housing 13. The cyclone 42 is securely connected to the connecting mouth 411 of the recovery cover 41 besides the exhaust housing 13 and has a top side. The recovery pipe 43 is connected to the cyclone 42 and the inlet shield 11 and has two ends. One of the two ends of the recovery pipe 43 is securely mounted on the top side of the cyclone 42 and the other one of the two ends of the recovery pipe 43 is connected to the connecting tube 111 of the inlet shield 11.

Figure 7:
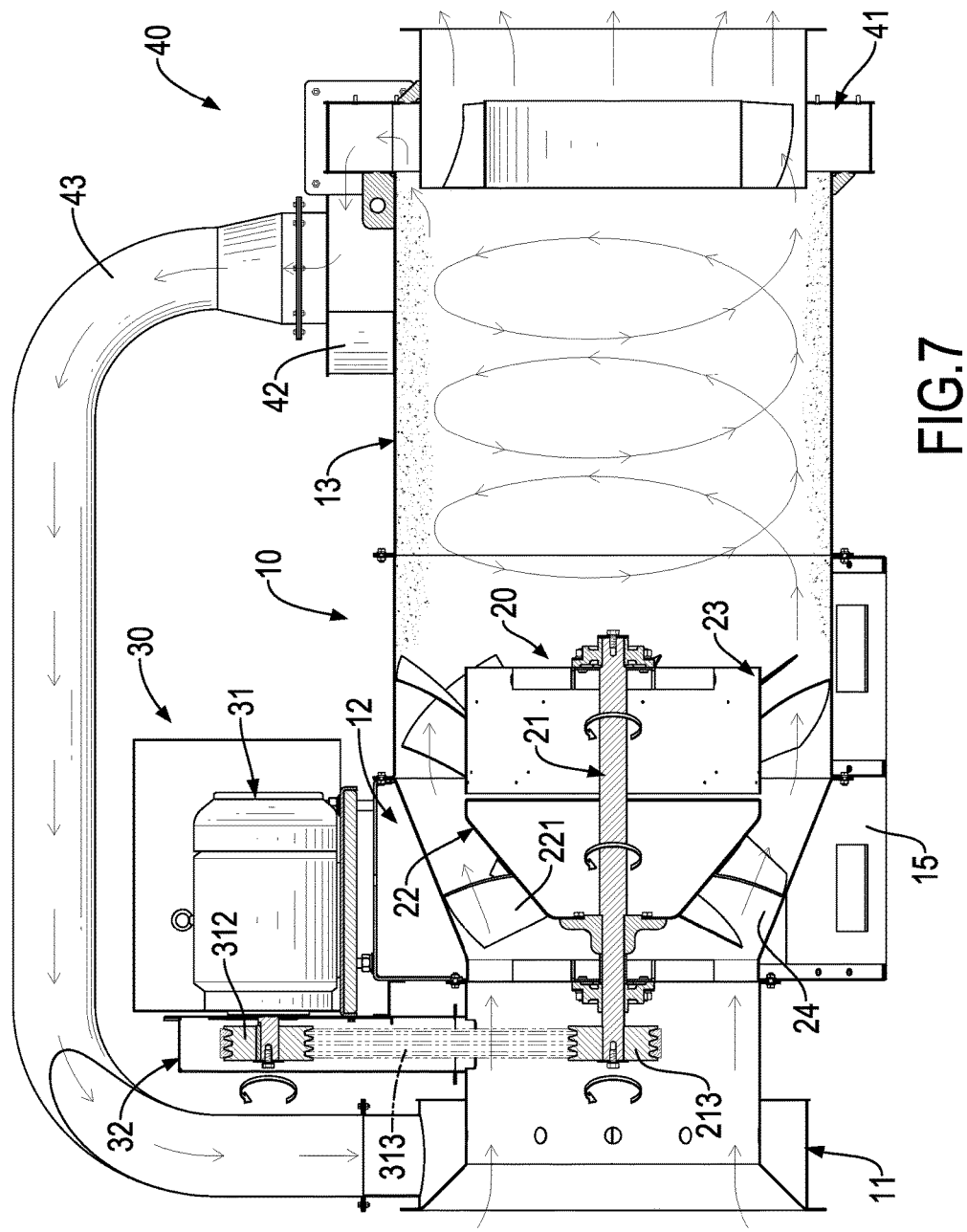
FIG. 7 is an operational side view in partial section of the ash-collecting and exhaust device in FIG. 5.
Figure 8:
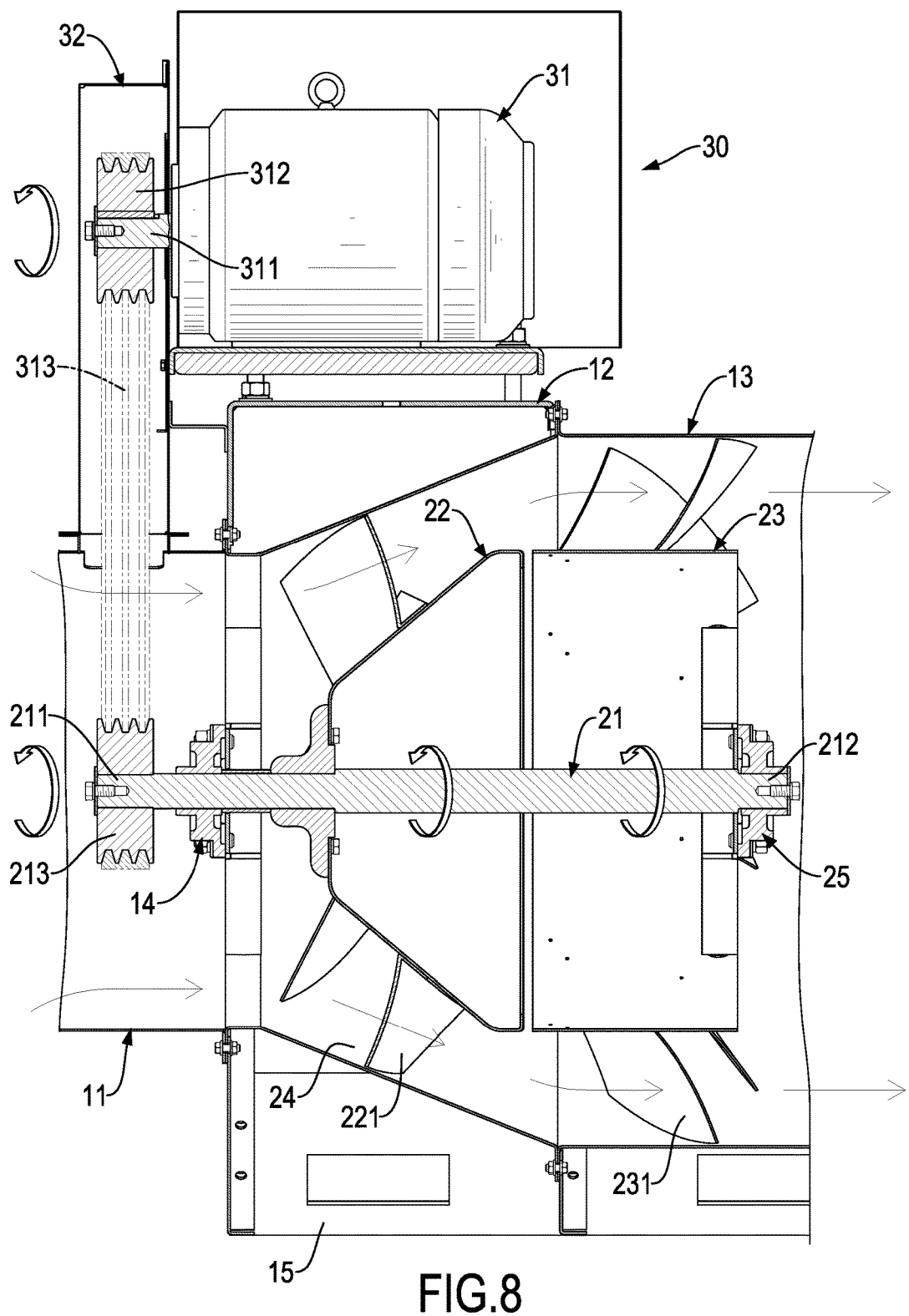
FIG. 8 is an enlarged and operational side view in partial section of the ash-collecting and exhaust device in FIG. 7.

In use, with reference to FIGS. 7 and 8, the driving shaft 311 is driven by the driving motor 31 to form a rotation force, and the rotation force is transmitted to the rotating shaft 21 via the driving wheel 312, the transmitting belt 313, and the transmitting wheel 213. Then, the fan 22 that is securely mounted around the rotating shaft 21 is rotated with the rotating shaft 21 relative to the body 10. When the fan 22 is rotated relative to the body, a low pressure is formed in the body 10 to enable air that is out of the body 10 to flow into the inlet shield 11 of the body 10 via the air inlet 101 and flow into the exhaust housing 13 along the oblique passage 24 between the guiding sheath 12 and the fan 22. In addition, when the air flows through the rectifier seat 23, the rectifier seat 23 may provide a rectifying effect to the air.

Furthermore, when the air flows in the oblique passage 24, the divergent spatial morphology and the guiding vanes 231 of the rectifier seat 23 may enable the air to flow along an internal surface of the body 10 in a centrifugal rotating type, and this may enable ashes or impurities in the air to accumulate on the internal surface of the body 10 to reduce the ashes or impurities in the air to provide an air-cleaning effect. In addition, the air is flowed in a diagonal-flow type and the fan 22 has sufficient structural strength during rotation and is free from breaking or damage. Therefore, the fan 22 of the fan unit 20 does not need any strengthening rib, and this may prevent the ashes or impurities from accumulating on the positions between the blades and the strengthening rib and prevent the fan 22 from vibration and damage during the rotation process by the accumulated ashes or impurities after a long time of use.

Additionally, with reference to FIG. 9, the air flows out of the body 10 via the exhaust housing 13 and the air outlet 102 after flowing through the oblique passage 24, when the air flows near the air outlet 102, part of the air flows into the cyclone 42 via the connecting mouth 411 of the recovery cover 41 in a centrifugal rotating type to further remove the ashes or impurities in the air, and flows into the inlet shield 11 again via the recovery pipe 43 with air that is out of the body 10. With reference to FIG. 4, the ashes or impurities that are removed by the cyclone 42 are collected via a bottom of the cyclone 42. Therefore, the cyclone 42 of the recovery unit 40 may collect the ashes or impurities in the air one more time, and this means the air is collected two times by the body 10 and the recovery unit 40 and this may improve the cleaning effect to the air.

Furthermore, the driving motor 31 of the driving unit 30 is mounted on the body 10 instead of mounting in the body 10, and may not be affected by the ashes or impurities in the air that flows into the body 10. Then, the temperature of the driving motor 31 may not be increased by the ashes or impurities in the air and the life of the driving motor 31 may be prolonged. In addition, since the driving motor 31 is mounted on the body 10 rather than in the body 10, and the driving motor 31 may be maintained or repaired without removing from the body 10, this is convenient in use and may reduce the time and cost of use. Additionally, the driving shaft 311, the driving wheel 312, and the transmitting belt 313 may not be affected by the external environment since the protecting cover 32 is mounted around the driving shaft 311, the driving wheel 312, and the transmitting belt 313.

According to the above-mentioned statements, the ash-collecting and exhaust device for a grain dryer as described has the following advantages.

1. In use, the divergent spatial morphology of the oblique passage 24 between the guiding sheath 12 of the body 10 and the fan 22 of the fan unit 20 may enable the air to flow along the internal surface of the body 10 in a centrifugal rotating type, and this may enable ashes or impurities in the air to accumulate on the internal surface of the body 10 to reduce the ashes or impurities in the air to provide an air-cleaning effect. In addition, the air is flowed in a diagonal-flow type and the fan 22 has sufficient structural strength during rotation and is free from breaking or damage. Therefore, the fan 22 of the fan unit 20 does not need any annular strengthening rib, and this may prevent the ashes or impurities from accumulating on the positions between the blades and the strengthening rib and prevent the fan 22 from vibration and damage during the rotation process by the accumulated ashes or impurities after a long time of use. Furthermore, the driving motor 31 of the driving unit 30 is mounted on the body 10 instead of mounting in the body 10, and may not be affected by the ashes or impurities in the air that flows into the body 10. Then, the temperature of the driving motor 31 may not be increased by the ashes or impurities in the air and the life of the driving motor 31 may be prolonged.

2. In use, the ashes or impurities are not accumulated on the internal surface of the body 10 but rather on the fan 22, and the damage probability and number of replacement of the fan 22 of the fan unit 20 may be reduced. In addition, since the driving motor 31 is mounted on the body 10 rather than in the body 10 and the driving motor 31 may be maintained or repaired without removing from the body 10, this is convenient in use and may reduce the time and cost of use.

3. When the air flows near the air outlet 102, part of the air flows into the cyclone 42 via the connecting mouth 411 of the recovery cover 41 in a centrifugal rotation type to further remove the ashes or impurities in the air, and flows into the inlet shield 11 again via the recovery pipe 43 with air that is out of the body 10. With reference to FIG. 4, the ashes or impurities that are removed by the cyclone 42 are collected via the bottom of the cyclone 42. Therefore, the cyclone 42 of the recovery unit 40 may collect the ashes or impurities in the air one more time, and this means the air is collected two times by the body 10 and the recovery unit 40 and this may improve the cleaning effect to the air.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An ash-collecting and exhaust device for a grain dryer having:
   a body being a hollow barrel and having
      two ends;
      an air inlet formed on one of the two ends of the body;
      an air outlet formed on the other one of the two ends of the body;
      an inlet shield formed on the body at the air inlet of the body and having a front side and a rear side;
      a guiding sheath securely connected to the inlet shield and having a front side connected to the rear side of the inlet shield and a rear side; and
      an internal surface of the guiding sheath being divergent from the front side to the rear side of the guiding sheath;
      an exhaust housing securely connected to the guiding sheath between the guiding sheath and the air outlet of the body and having an external surface; and
      a holding mount formed in the body at a connecting position between the inlet shield and the guiding sheath;
   a fan unit rotatably mounted in the body near the air inlet to enable external air to flow into the body via the air inlet and flow out of the body via the air outlet, and having an external surface being obliquely divergent from the air inlet to the air outlet to form an oblique passage between the internal surface of the guiding sheath of the body and the external surface of the fan unit;
      a rotating shaft rotatably mounted in the body, connected to the holding mount between the inlet shield, the guiding sheath, and the exhaust hosing;
      a fan mounted around the rotating shaft in the guiding sheath and having an external surface obliquely divergent from the inlet shield to the exhaust housing; and
      a rectifier seat mounted around the rotating shaft between the fan and the rotating shaft in the exhaust housing, and having
         an external surface being annular; and
         multiple guiding vanes formed on and protruding from the external surface of the rectifier seat at spaced intervals; and a driving unit securely mounted on the body, connected to the fan unit to enable the fan unit to rotate relative to the body to guide the external air flowing into the body.

2. The ash-collecting and exhaust device as claimed in claim 1, wherein the rotating shaft has
   a transmitting end extending into the inlet shield via the holding mount;
   a fixing end extending into the exhaust housing via the guiding sheath; and
   a transmitting wheel securely mounted around the transmitting end of the rotating shaft in the inlet shield.

3. The ash-collecting and exhaust device as claimed in claim 2, wherein the fan unit has a fixing frame mounted around the fixing end of the rotating shaft, securely connected to the rectifier seat to hold the rectifier seat on the rotating shaft to prevent the rectifier seat from rotating relative to the rotating shaft and the exhaust housing.

4. The ash-collecting and exhaust device as claimed in claim 3, wherein the ash-collecting and exhaust device has a recovery unit connected to the body and having
   a recovery cover mounted around the external surface of the exhaust housing, communicating with the exhaust housing, and having
      a top segment; and
      a connecting mouth formed on the top segment of the recovery cover and extending radially out of the exhaust housing;
   a cyclone securely connected to the connecting mouth of the recovery cover besides the exhaust housing and having a top side; and
   a recovery pipe connected to the cyclone and the inlet shield and having two ends, one of the two ends of the recovery pipe securely mounted on the top side of the cyclone and the other one of the two ends of the recovery pipe connected to the inlet shield.

5. The ash-collecting and exhaust device as claimed in claim 4, wherein the inlet shield has
   an external surface; and
   a connecting tube radially formed on and protruding from the external surface of the inlet shield near the front side of the inlet shield and connected to the recovery pipe opposite to the cyclone.

6. The ash-collecting and exhaust device as claimed in claim 5, wherein
   the inlet shield, the guiding sheath, and the exhaust housing are connected to each other by screwing or welding; and
   the body has a supporting base mounted on a bottom of the body above the guiding sheath to enable the body to dispose transversely.

7. The ash-collecting and exhaust device as claimed in claim 3, wherein the driving unit has a driving motor securely mounted on a top of the guiding sheath and having
   a driving shaft extending out of the driving motor toward the inlet shield;
   a driving wheel securely mounted around the driving shaft above the transmitting wheel; and
   a transmitting belt mounted around the driving wheel and the transmitting wheel via the inlet shield.

8. The ash-collecting and exhaust device as claimed in claim 7, wherein the driving unit has a protecting cover securely connected to the driving motor and the inlet shield to mount around the driving wheel and the transmitting belt.

9. The ash-collecting and exhaust device as claimed in claim 2, wherein the driving unit has a driving motor securely mounted on a top of the guiding sheath and having
   a driving shaft extending out of the driving motor toward the inlet shield;
   a driving wheel securely mounted around the driving shaft above the transmitting wheel; and
   a transmitting belt mounted around the driving wheel and the transmitting wheel via the inlet shield.

10. The ash-collecting and exhaust device as claimed in claim 9, wherein the driving unit has a protecting cover securely connected to the driving motor and the inlet shield to mount around the driving wheel and the transmitting belt.

11. The ash-collecting and exhaust device as claimed in claim 2, wherein the ash-collecting and exhaust device has a recovery unit connected to the body and having
    a recovery cover mounted around the external surface of the exhaust housing, communicating with the exhaust housing, and having
       a top segment; and
       a connecting mouth formed on the top segment of the recovery cover and extending radially out of the exhaust housing;
    a cyclone securely connected to the connecting mouth of the recovery cover besides the exhaust housing and having a top side; and
    a recovery pipe connected to the cyclone and the inlet shield and having two ends, one of the two ends of the recovery pipe securely mounted on the top side of the cyclone and the other one of the two ends of the recovery pipe connected to the inlet shield.

12. The ash-collecting and exhaust device as claimed in claim 11, wherein the inlet shield has
    an external surface; and
    a connecting tube radially formed on and protruding from the external surface of the inlet shield near the front side of the inlet shield and connected to the recovery pipe opposite to the cyclone.

13. The ash-collecting and exhaust device as claimed in claim 12, wherein
    the inlet shield, the guiding sheath, and the exhaust housing are connected to each other by screwing or welding; and
    the body has a supporting base mounted on a bottom of the body above the guiding sheath to enable the body to dispose transversely.

14. The ash-collecting and exhaust device as claimed in claim 1, wherein the ash-collecting and exhaust device has a recovery unit connected to the body and having
    a recovery cover mounted around the external surface of the exhaust housing, communicating with the exhaust housing, and having
       a top segment; and
       a connecting mouth formed on the top segment of the recovery cover and extending radially out of the exhaust housing;
    a cyclone securely connected to the connecting mouth of the recovery cover besides the exhaust housing and having a top side; and
    a recovery pipe connected to the cyclone and the inlet shield and having two ends, one of the two ends of the recovery pipe securely mounted on the top side of the cyclone and the other one of the two ends of the recovery pipe connected to the inlet shield.

15. The ash-collecting and exhaust device as claimed in claim 14, wherein the inlet shield has
    an external surface; and
    a connecting tube radially formed on and protruding from the external surface of the inlet shield near the front side of the inlet shield and connected to the recovery pipe opposite to the cyclone.

16. The ash-collecting and exhaust device as claimed in claim 15, wherein
the inlet shield, the guiding sheath, and the exhaust housing are connected to each other by screwing or welding; and
the body has a supporting base mounted on a bottom of the body above the guiding sheath to enable the body to dispose transversely.

17. An ash-collecting and exhaust device for a grain dryer having:
a body being a hollow barrel and having
two ends;
an air inlet formed on one of the two ends of the body;
an air outlet formed on the other one of the two ends of the body;
an inlet shield formed on the body at the air inlet of the body and having a front side and a rear side;
a guiding sheath securely connected to the inlet shield and having a front side connected to the rear side of the inlet shield and a rear side; and
an internal surface of the guiding sheath being divergent from the front side to the rear side of the guiding sheath;
an exhaust housing securely connected to the guiding sheath between the guiding sheath and the air outlet of the body and having an external surface; and
a fan unit rotatably mounted in the body near the air inlet to enable external air to flow into the body via the air inlet and flow out of the body via the air outlet, and having an external surface being obliquely divergent from the air inlet to the air outlet to form an oblique passage between the internal surface of the guiding sheath of the body and the external surface of the fan unit; and
a driving unit securely mounted on the body, connected to the fan unit to enable the fan unit to rotate relative to the body to guide the external air flowing into the body;
the ash-collecting and exhaust device having a recovery unit connected to the body and having
a recovery cover mounted around the external surface of the exhaust housing, communicating with the exhaust housing, and having
a top segment; and
a connecting mouth formed on the top segment of the recovery cover and extending radially out of the exhaust housing;
a cyclone securely connected to the connecting mouth of the recovery cover besides the exhaust housing and having a top side; and
a recovery pipe connected to the cyclone and the inlet shield and having two ends, one of the two ends of the recovery pipe securely mounted on the top side of the cyclone and the other one of the two ends of the recovery pipe connected to the inlet shield.

18. The ash-collecting and exhaust device as claimed in claim 17, wherein the inlet shield has
an external surface; and
a connecting tube radially formed on and protruding from the external surface of the inlet shield near the front side of the inlet shield and connected to the recovery pipe opposite to the cyclone.

19. The ash-collecting and exhaust device as claimed in claim 18, wherein
the inlet shield, the guiding sheath, and the exhaust housing are connected to each other by screwing or welding; and
the body has a supporting base mounted on a bottom of the body above the guiding sheath to enable the body to dispose transversely.

* * * * *